J. Sitton,
Making Carriage Wheels.
Nº 15,901. Patented Oct. 14, 1856.
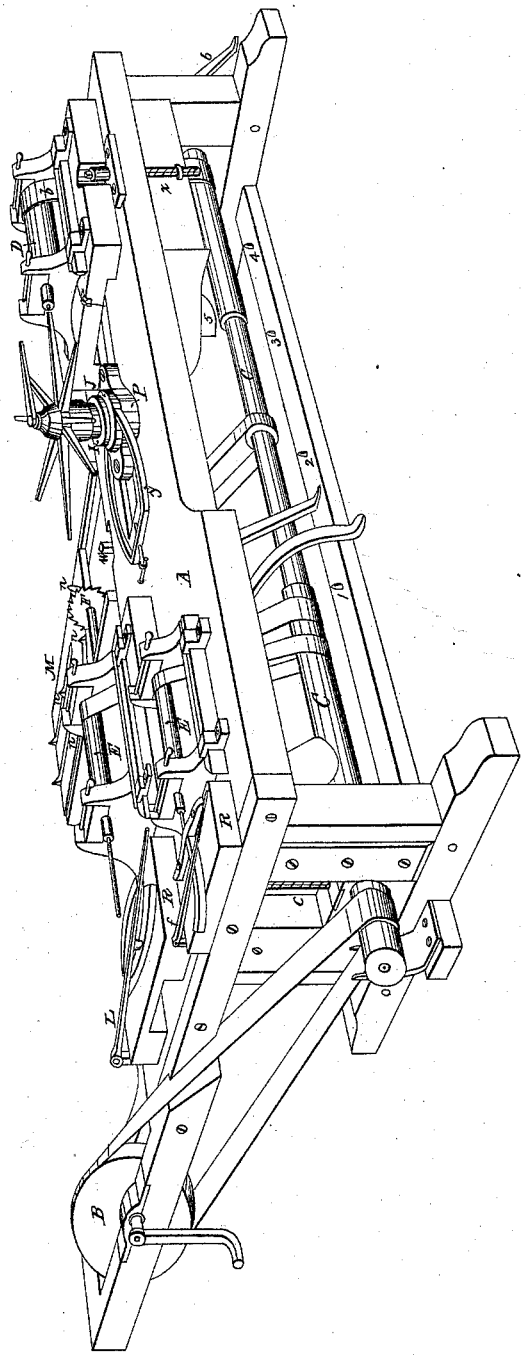

UNITED STATES PATENT OFFICE.

JOHN SITTON, OF WILLIAMSTON, SOUTH CAROLINA.

WHEELWRIGHT'S MACHINE.

Specification of Letters Patent No. 15,901, dated October 14, 1856.

*To all whom it may concern:*

Be it known that I, JOHN SITTON, of Williamston, in the county of Anderson and State of South Carolina, have invented new and useful Improvements Upon a Machine for Making Carriage-Wheels, secured to me by Letters Patent of the United States bearing date February 15, 1827; and I do hereby declare that the following is a full and exact description thereof, reference being had to the accompanying drawing and to the letters of reference marked thereon.

The nature of my invention consists in the arrangement and adaptation of machinery for sawing the ends of fellies and boring the holes therein and also for boring hubs for mortising and also forming the tenons on the ends of the spokes so as to greatly simplify and facilitate these operations.

To enable others skilled in the art to make and use my invention, I will proceed to describe its construction and operation.

In the accompanying drawing A, is a table frame upon which the various parts are arranged.

B, represents the power applied.

C, is a shaft of pulleys running the entire length of the frame so as to suit the various belts required for the operation of the several parts. This shaft is moved by a belt from the power-wheel B, which belt is shifted from a tight to a loose pulley by the slide S, which slide is operated with the foot by means of the pins 1, 2, 3, 4.

D, is a hollow auger with a center-bit, working in sliding bearings, as shown. This auger is run up by a weight 5, and back by a treadle 6, for the purpose of cutting the tenons on the ends of the spokes. It, with its frame or bearings can be raised or lowered by means of the screw $x$, (and its mate on the opposite side) so as to suit any height of hub. This auger is operated by a belt $b$ from the shaft below. By taking out the hollow auger and replacing it with a common bit and running up the hub-plate P the holes for mortising the hubs can be bored. When this is done the stirrup $y$, is used to secure the hub in place so that the auger may not be injured on entering the cavity of the hub and striking against the rod used when cutting the tenons. The hub-plate P, is formed by one piece I fitting nicely and turning in another J the hub being secured to I by projecting points therein.

E, E, are augers working in sliding bearings and run up and back by weight and treadle similar to D, one for boring the holes for the spoke-tenons and the other the dowel holes in the end of the fellies. The blocks R, R, upon which the fellies rest can be replaced by others adapted to the augers necessary for fellies of different size. The fellies are held securely in their places for boring by means of the levers L, L, as shown.

F, is a small circular saw for cutting the ends of fellies to the proper slope. For this purpose the fellies are placed on the sliding leaf M, against the stops $n, n, n, n$, and held in place by one hand while the leaf is run up by the other. The stops are adjustable to suit any circle of wheel. The saw can be stopped at pleasure by means of the screw $w$ which operates a tightening pulley below not shown in the drawing.

When desired to run one part of the machine alone the other parts are thrown out of gear by means of screw C, and its fellow at the other end operating the shaft up or down thus tightening or loosening the several belts.

I do not claim the several devices described separately, but I do claim them when combined and operated as shown and specified.

JOHN SITTON.

Witnesses:
JOHN M. CARLESLE,
F. A. HOKE.